UNITED STATES PATENT OFFICE.

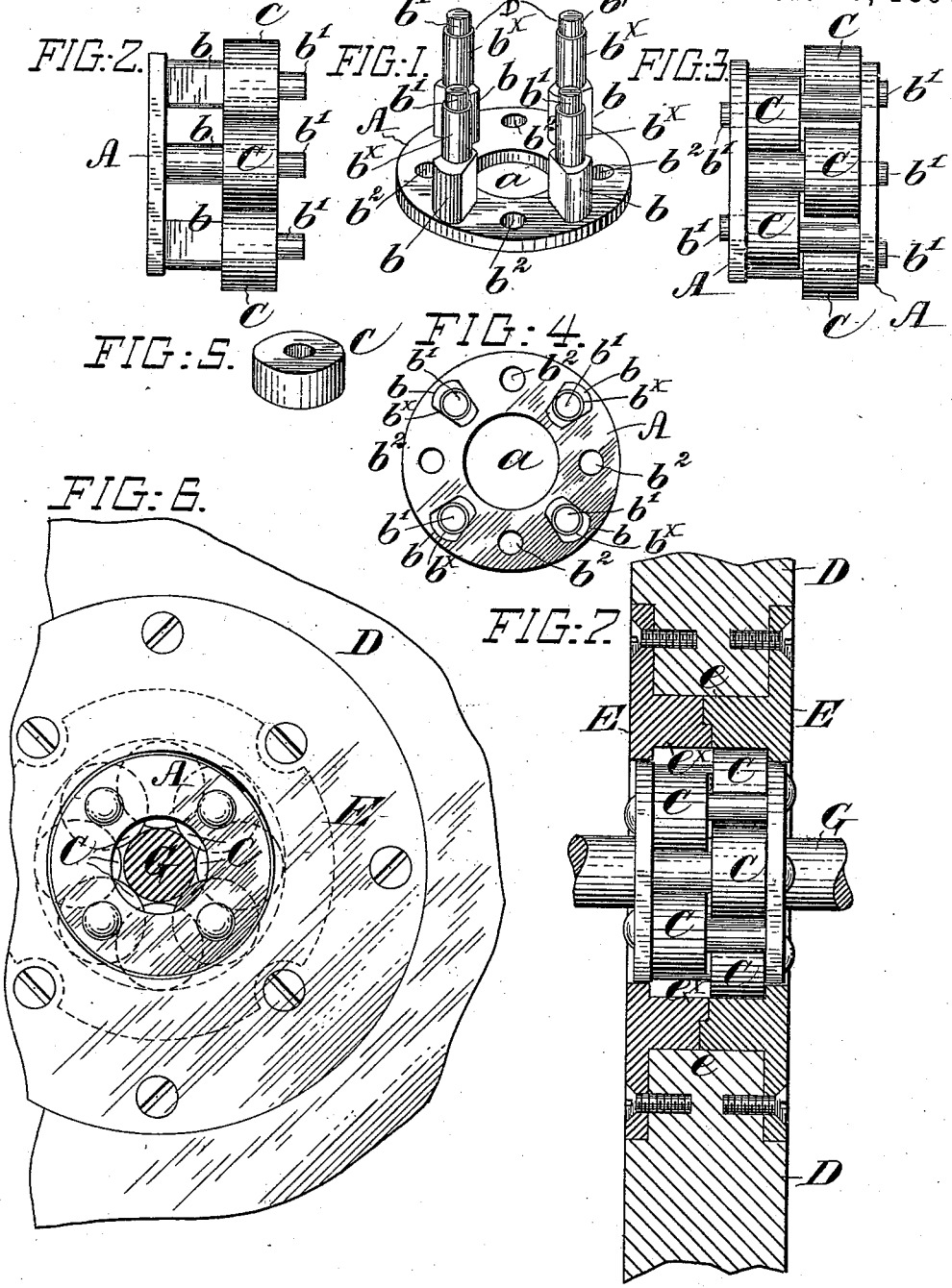

WILLIAM H. THOMPSON, OF MORRISTOWN, NEW JERSEY, ASSIGNOR TO JOHN S. W. THOMPSON, OF SAME PLACE.

ROLLER-BEARING FOR WHEELS.

SPECIFICATION forming part of Letters Patent No. 515,178, dated February 20, 1894.

Application filed October 20, 1893. Serial No. 488,723. (No model.)

*To all whom it may concern:*

Be it known that I, WILLIAM H. THOMPSON, a citizen of the United States, residing at Morristown, in the county of Morris and State of New Jersey, have invented certain new and useful Improvements in Roller-Bearings for Wheels and other Rotative Parts, of which the following is a specification.

My invention relates to the class of roller bearings wherein a gang of rollers is interposed between a stationary journal and the hub or center of a wheel, sheave, or the like, the rollers rolling at their outer faces on an internal track formed in the said hub or center. A roller bearing of this general class is illustrated in my Patent No. 504,287. These roller bearings are commonly used in situations where they must bear the roughest usage and extraordinary strains applied obliquely as well as directly or squarely, and the object of my present improvement is, in part, to improve the construction so as to increase resistance to strains of a twisting and wrenching character, and in part to improve the construction in such a manner that bearing may be completed before it is set in its track-way in the boss or center of the wheel.

The invention will be fully described hereinafter with reference to the accompanying drawings, wherein—

Figure 1 is a perspective view of one of the two like pintle-sections of the roller bearing. Fig. 2 is a side view of the same showing a set of rollers mounted on the pintles of this section. Fig. 3 is a side view of the two sections of the bearing fitted together and carrying their rollers. This view shows all the elements of the bearing assembled. Fig. 4 is a plan view of one of the roller-carrying pintle-sections; and Fig. 5 is a perspective view of one of the rollers, detached. Fig. 6 is a side view of a wheel, or the central part thereof, provided with my improved roller bearing; and Fig. 7 is a section through the wheel showing the finished bearing in position.

The pintle-section seen in Figs. 1 and 4 comprises a plate, A, preferably circular exteriorly and having in it an aperture, $a$. This plate is of cast metal, and formed integrally with it are like roller pintles, B, four as herein shown. These pintles are spaced at equal distances apart and their axes are all situated at the same distance from the center of the plate A. Each pintle comprises a broad or thick base portion, $b$, a cylindrical journal, $b^\times$, and a reduced extremity, $b'$. Midway between the axes of the pintles are holes, $b^2$, in the plate A; these holes are situated at exactly the same distance from the center of the plate A as the pintles. The bearing requires two of these pintle-sections, which are fitted together face to face, the extremities, $b'$, on the pintles of one section, entering and fitting snugly the holes $b^2$, in the plate A, of the other section. Before fittting the sections together, however, the rollers, C, one of which is seen detached in Fig. 5, are slipped onto the journals, $b^\times$, of the respective pintles. To do this conveniently, four rollers may be slipped on the pintles of one section, as seen in Fig. 2, and the other four rollers be placed in position between the bases of the pintles on this section. The other section may then be put in place, when the assembled parts will appear as in Fig. 3. It will be noted that the journals $b^\times$, are of the same length as the rollers, and the bases $b$, of the pintles are a very little longer than the rollers. This prevents the rollers of one set from chafing or rubbing against those of the other set. After the parts are assembled as in Fig. 4, the ends of the pintles which project through the holes $b^2$, in the plates A, are riveted solidly down upon the said plates as indicated in Figs. 6 and 7.

When constructed in this manner the bearing will be perfectly staunch and capable of resisting strains tending to distortion, as the pintles have their bases as broad as the spaces required for the rollers will admit, and they are cast integrally with the plate.

I prefer to make the rollers of steel and the pintle-sections of brass, bronze, or other metal not oxidizable like iron or steel, as otherwise exposure to dampness is apt to cause the rollers to rust fast on their journals.

Fig. 7 shows the preferred form of wheel-center to receive the bearing. D represents a sheave or wheel of wood in which is secured the metal center, made in two sections, E, E, meeting in the plane of the wheel at, $e$, where they have interlocking shoulders formed by turning them in a lathe. A track, $e^x$, is formed in the wheel-center, for the rollers of the bearing to roll on. This sectional construction of the wheel section permits of finishing the bearing by riveting the pintles before placing the bearing in the wheel center. If the latter is integrally constructed it will be necessary to assemble the parts of the bearing in the wheel-eye and rivet the pintles afterward.

G is the spindle or fixed shaft about which the wheel turns.

Having thus described my invention, I claim—

A roller bearing comprising rollers C, and two like pintle-sections of cast metal each of said sections comprising a plate A, having a central aperture $a$, and a series of holes $b^2$, to receive the pintles on the other section, and the pintles formed integrally with the plate A and having each a broad base portion $b$, a journal $b^x$, for the roller, and a reduced extremity, substantially as set forth.

In witness whereof I have hereunto signed my name in the presence of two subscribing witnesses.

WILLIAM H. THOMPSON.

Witnesses:
JAMES L. MITCHELL,
JOHN S. W. THOMPSON.